United States Patent
Zhang et al.

(10) Patent No.: US 9,533,618 B2
(45) Date of Patent: Jan. 3, 2017

(54) METHOD, APPARATUS AND SYSTEM FOR PROCESSING A DISPLAY FROM A SURROUND VIEW CAMERA SOLUTION

(71) Applicant: Texas Instruments Incorporated, Dallas, TX (US)

(72) Inventors: Buyue Zhang, Santa Clara, CA (US); Ibrahim Pekkucuksen, Dallas, TX (US); Vikram Appia, Dallas, TX (US); Aziz Umit Batur, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/642,510

(22) Filed: Mar. 9, 2015

(65) Prior Publication Data

US 2015/0254825 A1    Sep. 10, 2015

Related U.S. Application Data

(60) Provisional application No. 61/949,450, filed on Mar. 7, 2014.

(51) Int. Cl.
*B60R 1/00* (2006.01)
*G06T 3/40* (2006.01)

(52) U.S. Cl.
CPC .............. *B60R 1/00* (2013.01); *G06T 3/4038* (2013.01); *B60R 2300/303* (2013.01); *B60R 2300/607* (2013.01)

(58) Field of Classification Search
CPC ............. B06R 1/00; H04N 9/045; H04N 9/64; H04N 9/735; H04N 2209/046; H04N 9/73; H04N 5/23238; H04N 9/68; G06T 2207/10024; G06T 3/4038; G06T 5/006; G06T 2207/10016; G06T 2207/20221; B60R 2300/60
See application file for complete search history.

(56) References Cited

U.S. PATENT DOCUMENTS

| | | | | |
|---|---|---|---|---|
| 7,133,083 | B2* | 11/2006 | Jaynes | G03B 21/26 348/189 |
| 2001/0038718 | A1* | 11/2001 | Kumar | G06T 3/0081 382/284 |
| 2004/0085477 | A1* | 5/2004 | Majumder | H04N 9/12 348/383 |
| 2005/0151837 | A1* | 7/2005 | Cutler | G06T 3/0062 348/36 |

(Continued)

OTHER PUBLICATIONS

C. Harris and M. Stephens, "A Combined Corner and Edge Detector," Proc. Alvey Vision Conf. pp. 147-151, 1988.

(Continued)

*Primary Examiner* — Jingge Wu
(74) *Attorney, Agent, or Firm* — Gregory J. Albin; Charles A. Brill; Frank D. Cimino (57) ABSTRACT

A method, apparatus and a system multi-camera image processing method. The method includes performing geometric alignment to produce a geometric output, performing photometric alignment to produce a photometric output and blending output, using data from the geometric alignment and the photometric alignment for performing synthesis function for at least one of blending and stitching images from the multi-cameras, and displaying an image from the synthesis function.

16 Claims, 8 Drawing Sheets

(56) References Cited

U.S. PATENT DOCUMENTS

| | | | |
|---|---|---|---|
| 2012/0019614 A1* | 1/2012 | Murray | H04N 13/0007 348/36 |
| 2012/0127324 A1* | 5/2012 | Dickins | G09G 3/006 348/191 |
| 2012/0320203 A1* | 12/2012 | Liu | G01C 11/04 348/144 |
| 2013/0329002 A1* | 12/2013 | Tico | G06T 3/4038 348/36 |
| 2014/0098229 A1* | 4/2014 | Lu | H04N 7/181 348/148 |
| 2014/0247352 A1* | 9/2014 | Rathi | B60R 1/00 348/148 |
| 2014/0247354 A1* | 9/2014 | Knudsen | B60R 1/00 348/148 |
| 2014/0300687 A1* | 10/2014 | Gillard | G06T 15/20 348/36 |
| 2015/0049193 A1* | 2/2015 | Gupta | G03B 43/00 348/148 |
| 2015/0138312 A1 | 5/2015 | Liu et al. | |

OTHER PUBLICATIONS

M. Calonder, V. Lepetit, C. Strecha and P. Fua BRIEF: Binary Robust Independent Elementary Features In Proceedings of the European Conference on Computer Vision (ECCV) 2010.

* cited by examiner

METHOD, APPARATUS AND SYSTEM FOR PROCESSING A DISPLAY FROM A SURROUND VIEW CAMERA SOLUTION

CROSS REFERENCES TO RELATED APPLICATIONS

This application claims priority from U.S. Provisional Patent Application No. 61/949,450 filed on Mar. 7, 2014, which is hereby incorporated by reference in its entirety.

BACKGROUND OF THE INVENTION

Field of the Invention

Embodiments of the present invention generally relate to a method and system for generating a display from a surround view camera solution.

Description of the Related Art

Figure 1:
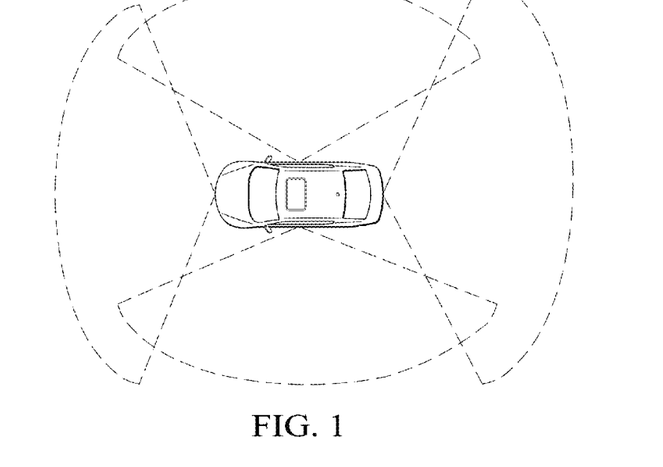
FIG. 1 is an embodiment of a multi-camera surround view system in an advanced driver assistance system (ADAS) consisting of four to six wide-angle cameras mounted around a vehicle, each facing one direction.
Figure 2:
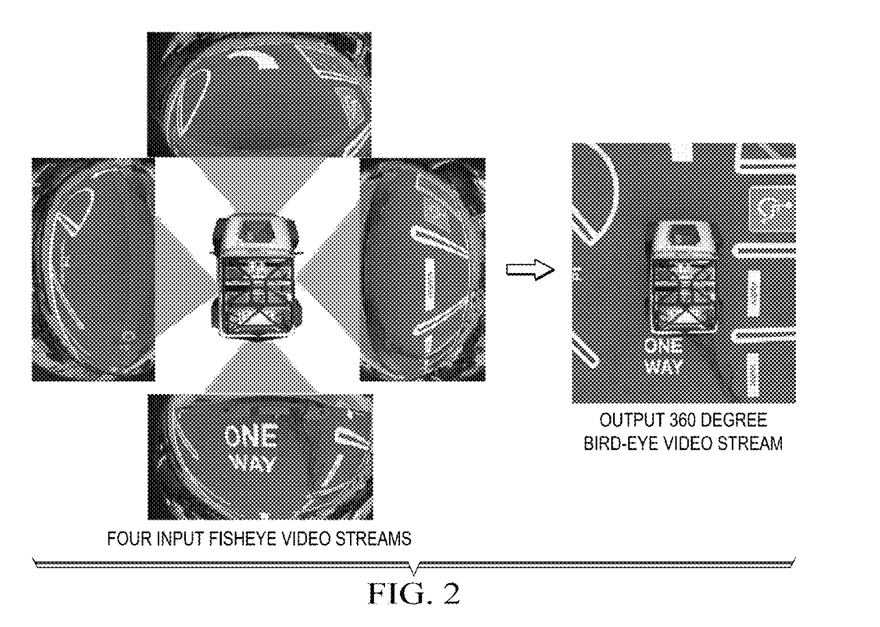
FIG. 2 is an embodiment of a composite bird-eye view of a vehicle is synthesized and shown to the driver in real-time.

In a multi-camera surround view camera solution, a multi-camera, fisheye input images and video streams are used to generate a bird-eye view of the surroundings in real time. Such a system is used, for example, in vehicles to monitor vehicle surroundings when the driver is driving, parking, changing lanes and the likes. Such a solution helps the driver park safely by allowing him/her to see the entire 360 degree surrounding of the vehicle. FIG. 1 is an embodiment of a multi-camera surround view system in an advanced driver assistance system (ADAS) consisting of four to six wide-angle cameras mounted around a vehicle, each facing one direction. In FIG. 1, the four wide-angle or fisheye cameras are mounted around the vehicle, each facing one direction. Usually one camera is in the middle of the front grille, one at the back above the license plate, and one camera look down from each of the side view mirror. FIG. 2 is an embodiment of a composite bird-eye view of a vehicle is synthesized and shown to the driver in real-time. As shown in FIG. 2, the surround view camera solution synthesizes a 360 degree bird-eye view of the vehicle from four or more input video streams. The goal is to use the images and videos from the multi-camera system to produce a seamlessly stitched 360 degree composite view that looks like it were taken by a single camera above the vehicle.

Therefore, there is a need for a method, apparatus and/or system for processing a seamless view from a surround view camera system.

SUMMARY OF THE INVENTION

Embodiments of the present invention relate to method, apparatus and a system multi-camera image processing method. The method includes performing geometric alignment to produce a geometric output, performing photometric alignment to produce a photometric output and blending output, using data from the geometric alignment and the photometric alignment for performing synthesis function for at least one of blending and stitching images from the multi-cameras, and displaying an output image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The goal of this solution is to produce a seamlessly stitched 360 degree composite view from four fisheye camera input. This is achieved by three key components of the solution: geometric alignment algorithm, photometric alignment algorithm, and synthesis algorithm. Geometric alignment corrects fisheye distortion from the original input video frames and converts each input video frame from its respective perspective to a common bird-eye perspective. Photometric alignment corrects the brightness and color mismatch between adjacent views to achieve seamless stitching. Finally, the synthesis algorithm generates the composite surround view after geometric and photometric corrections and simultaneously it collects statistics that are required for the photometric alignment algorithm. In a preferred embodiment, such a solution would be the requirement of an embedded system.

Figure 3A:
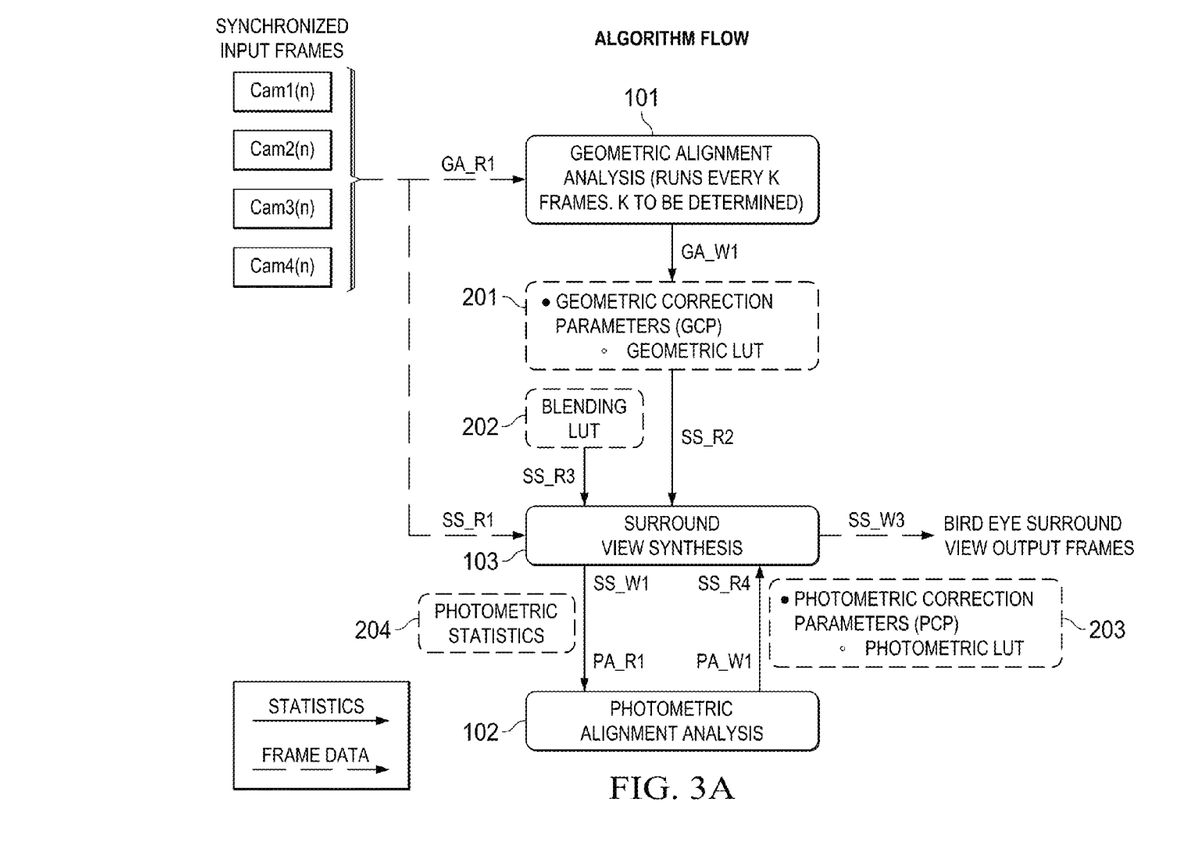
FIG. 3A is an embodiment of a flow diagram of method depicting a surround view solution.

FIG. 3 is an embodiment of a flow diagram of method 300 depicting a surround view solution. Block 101 represents the step of performing geometric alignment analysis. The input to geometric alignment analysis are four synchronized video streams from fisheye cameras, cam1($n$)-cam4($n$), each camera has a 180-degree field of view (FoV). Geometric alignment output a look-up-table (Geometric LUT), shown in block 201. The Geometric LUT specifies how to synthesize each pixel in the output frame from the four input frames. Since geometric alignment parameters, i.e., the LUT, only depends on the location of the cameras and they do not change significantly after the initial installation, block 101 is usually called by the system framework every K frames, K>1, to update the geometric LUT. In one embodiment, block 101 is called only once when the system is powered up. After it finishes, geometric LUT is then saved to the memory.

Figure 4:
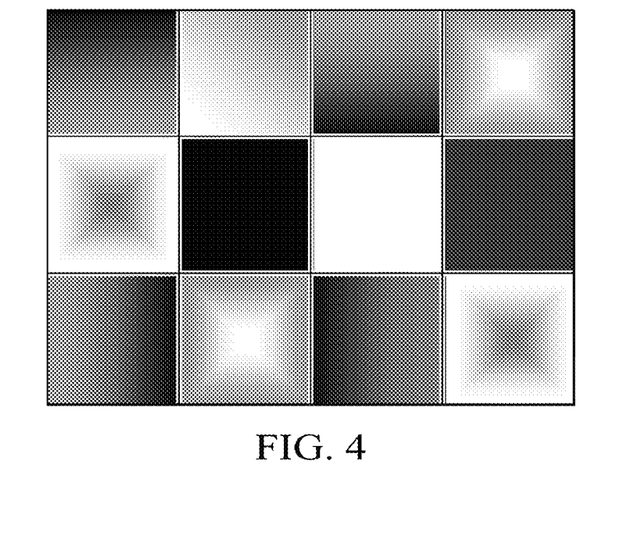
FIG. 4 is an embodiment of a geometric alignment chart.

The goal of geometric alignment is to transform and align four input fish eye lens frames so that the stitched bird's eye view output is seamless. To achieve this we are following a chart based approach. Such an algorithm is designed to be as flexible with the chart content, with the ultimate goal of removing charts altogether. Nevertheless, distinctive chart content may help the algorithm in terms of finding and matching features. One particular chart design that we used extensively is shown in FIG. 4. FIG. 4 is an embodiment of a geometric alignment chart.

Figure 3B:
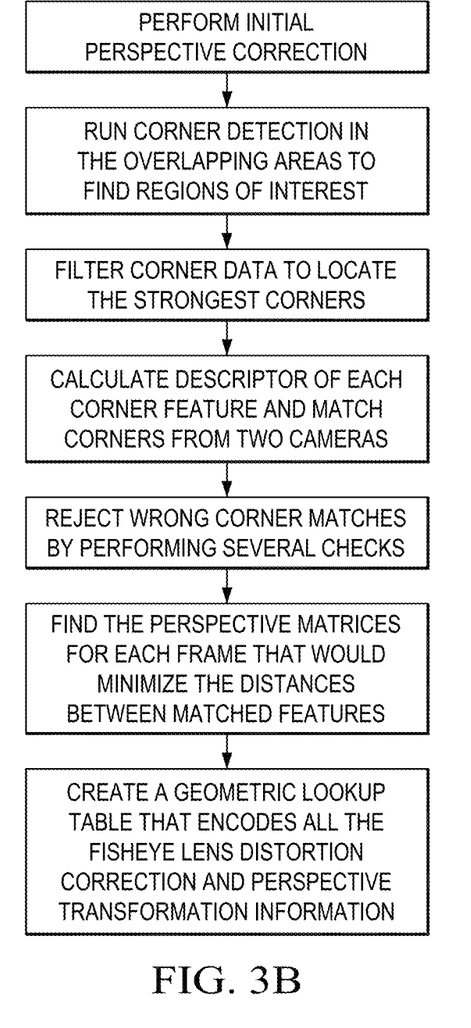
FIG. 3B is an embodiment of a flow diagram of method depicting a geometric alignment.

FIG. 3B is an embodiment of a flow diagram of method depicting a geometric alignment. For the geometric alignment, one such chart is placed in each of the overlapping regions shown in FIG. 4 and one frame from each camera is captured simultaneously. The algorithm steps for geometric alignment are as follows: (1). Perform initial perspective correction on each frame. The parameters for such correction may be obtained from camera placement specifications or estimated from the frame content itself; (2). Run Harris corner detection, or the likes, in the overlapping areas to find regions of interest; (3). Filter Harris corner data to locate the strongest corners; (4). Calculate BRIEF descriptor of each corner feature and match corners from two cameras using BRIEF scores; (5). Reject wrong corner matches by performing several checks; (6). Find the perspective matrices for each frame that would minimize the distances between matched features; (7). Create a geometric lookup table that encodes all the fisheye lens distortion correction and perspective transformation information to create the stitched output frame from input frames in a single step.

Block 102 represents the step of performing photometric alignment analysis function. Photometric alignment analysis uses statistics, shown in block 204, as the input. Photometric alignment analysis outputs a Photometric LUT, shown in block 203, for each input camera/view and for each color channel. In one embodiment, the photometric LUT maps an input value (0~255) to an output value (0~255). The goal of photometric correction is to correct the brightness and color mismatch among the four views so that there is no visible seams in the composite surround view. This is achieved by applying tone mapping to each view before stitching.

Figure 5:
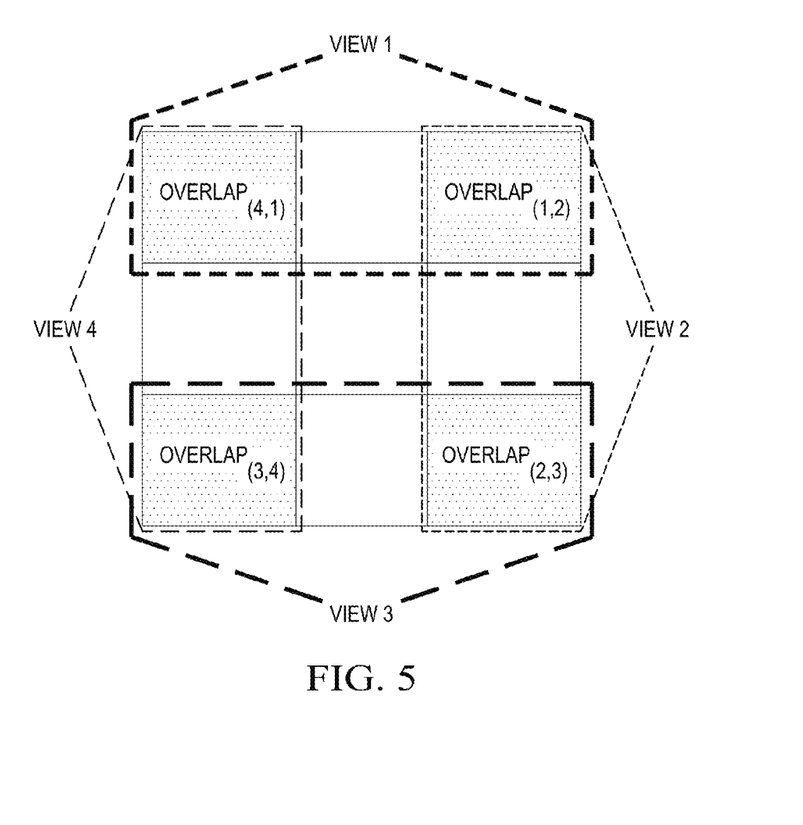
FIG. 5 is an embodiment of views and overlapping regions in the composite surround view.

FIG. 5 is an embodiment of views and overlapping regions in the composite surround view. As shown in FIG. 5, the composite surround view consists of data from all four input frames, view 1, 2, 3, and 4. The overlapping regions are the portion of the frames that come from the same physical world and captured by two adjacent cameras, for example, Overlap$_{(1,2)}$ refers to the overlapping region between view 1 and view 2, and so on. The Photometric alignment function (block 102 in FIG. 3) uses data in Overlap$_{(1,2)}$, Overlap$_{(2,3)}$, Overlap$_{(3,4)}$, and Overlap$_{(4,1)}$ to estimate a tone mapping curve for each camera and each color channel.

Figure 6:
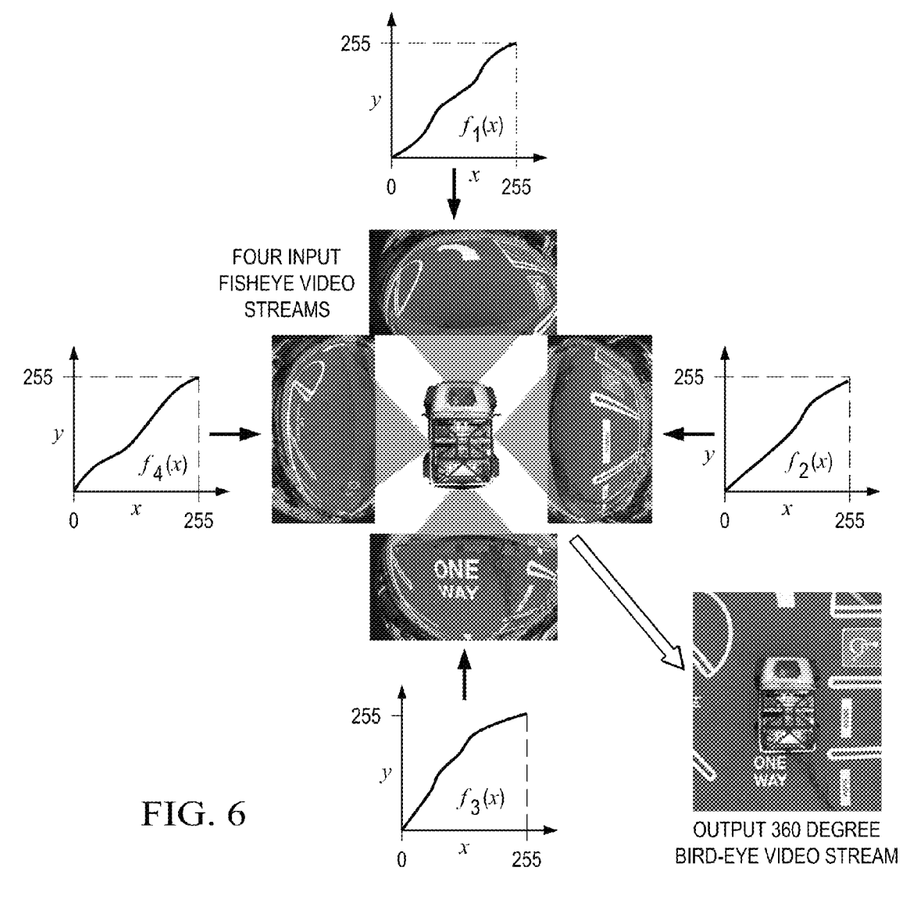
FIG. 6 is an embodiment of a tone mapping curves and photometric alignment correction.

FIG. 6 is an embodiment of a tone mapping curves and photometric alignment correction. The tone mapping curves, as shown in FIG. 6, are functions that map an input value to an output value. For RGB input data format, $\{f_1^{(k)}(x), f_2^{(k)}(x), f_3^{(k)}(x), f_4^{(k)}(x)\}$ are jointly optimized for all four views (i.e., cameras), but independently for each color channel, k=1, 2, 3.

Block 103 represents the step of performing synthesis function, which may execute every frame. The input to the synthesis function are: (1). the fisheye frames from the four cameras, cam1(n)-cam4(n); (2). the geometric LUT outputted from the geometric alignment analysis; (3). the photometric LUT, of block 203; and (4). the blending LUT (block 202). Synthesis function outputs the composite surround view frame. Synthesis function also outputs photometric statistic to the photometric function, which is used to generate the photometric LUT. The geometric LUT maps each output pixel location with a corresponding pixel locations in the input images. Each of the output pixel comes from either a single location from one input camera or two locations from two adjacent cameras, in the overlapping regions. The blending LUT specifies a weight for each pair of pixels that belong to the same object in the physical world, but captured by two adjacent cameras. With blending operation, the visibility of seams due to transition between adjacent camera is eliminated. The photometric LUT specifies how to map an input pixel value to an output pixel intensity value so that the brightness and color of adjacent views are matched at the overlapping region.

The Synthesis function has two outputs: 1) the composite surround view frame, and 2) the statistics for photometric function, shown in block 204. Statistics required by photometric function are block average of the input frames in the overlapping regions for each color channel. These input images undergo geometric correction to be used in statistic generation. Ideally, the statistics should be collected by the photometric alignment block independent of synthesis function, but that will significantly increase memory bandwidth. Since the synthesis function performs the geometric correction, to reduce memory bandwidth, these statistics are collected in synthesis function, of block 103, are collected for the current frame (frame n) and use the statistics for photometric correction during frame (n+1). Such a design limits all pixel-level computational intensive operation required for every frame to the Synthesis function, but not in photometric function, of block 102. Such a method significantly reduces memory bandwidth.

For off-line calibration approach, geometric function, of block 101, may be called once when the system is powering on. Geometric LUT is usually saved in memory and accessed by synthesis function, of block 103, usually at every frame. For a dynamic calibration approach, geometric LUT may be called every K frames, e.g., K=600, and therefore, the geometric LUT may be updated only every K frames. In one embodiment, the synthesis of block 103 preferably uses the most recent geometric LUT from the memory to generate the output frame.

Thus, in one embodiment, at frame n, synthesis function takes four input fisheye frames, the most recent geometric LUT, and the current photometric LUT, and output a composite surround view frame. The Photometric function also runs every frame and takes the statistics collected by Synthesis function at frame (n−1), it outputs a photometric LUT for the current frame (frame n). The Geometric function runs asynchronously with Photometric and Synthesis functions and only updates the Geometric LUT in memory every K frames (K>1), or in our current implementation, only update it once when the system is powered up.

The design of such a surround view solution has several novelties, for example: (1). Such a framework incorporates both the dynamic calibration approach and the one-time calibration approach; (2). All pixel level operation that is required for every frame is carried out in Synthesis function (block 103). All necessary operations happen when we go through each output pixel in the composite view in Synthesis. It greatly reduces memory bandwidth requirement since Photometric function, of block 102, no longer needs to access the input frame data. (3). The output of the Geometric function 101, shown in block 201, and the blending weights, of block 202, are both saved in the form of LUT in the memory to save computation, by reducing on-the-fly computation at every frame; (4). In one embodiment, the output of the Photometric function 102, shown in block 203, is designed to be a LUT which has 255 entries for 8-bit data input. It not only provides sufficient quality, also ensures fast implementation as it is a global operation independent of spatial neighborhood; (5). The entire data flow is our unique creation for efficient memory usage and computation targeting embedded platforms. Geometric function 101 and photometric function of block 102 are also novel.

Synthesis function receives input video streams from four fish-eye cameras and creates a composite surround view. Mapping of each output pixel location to the corresponding pixel locations in input images are stored in the geometric LUT. As Shown in FIG. 5, there are some overlap regions in the output frame. In these regions, each output pixel will map to two pixels in two different input images. Based on how we handle these pixels in the overlap regions, we have a simple and a blending stitch method.

Figure 7:
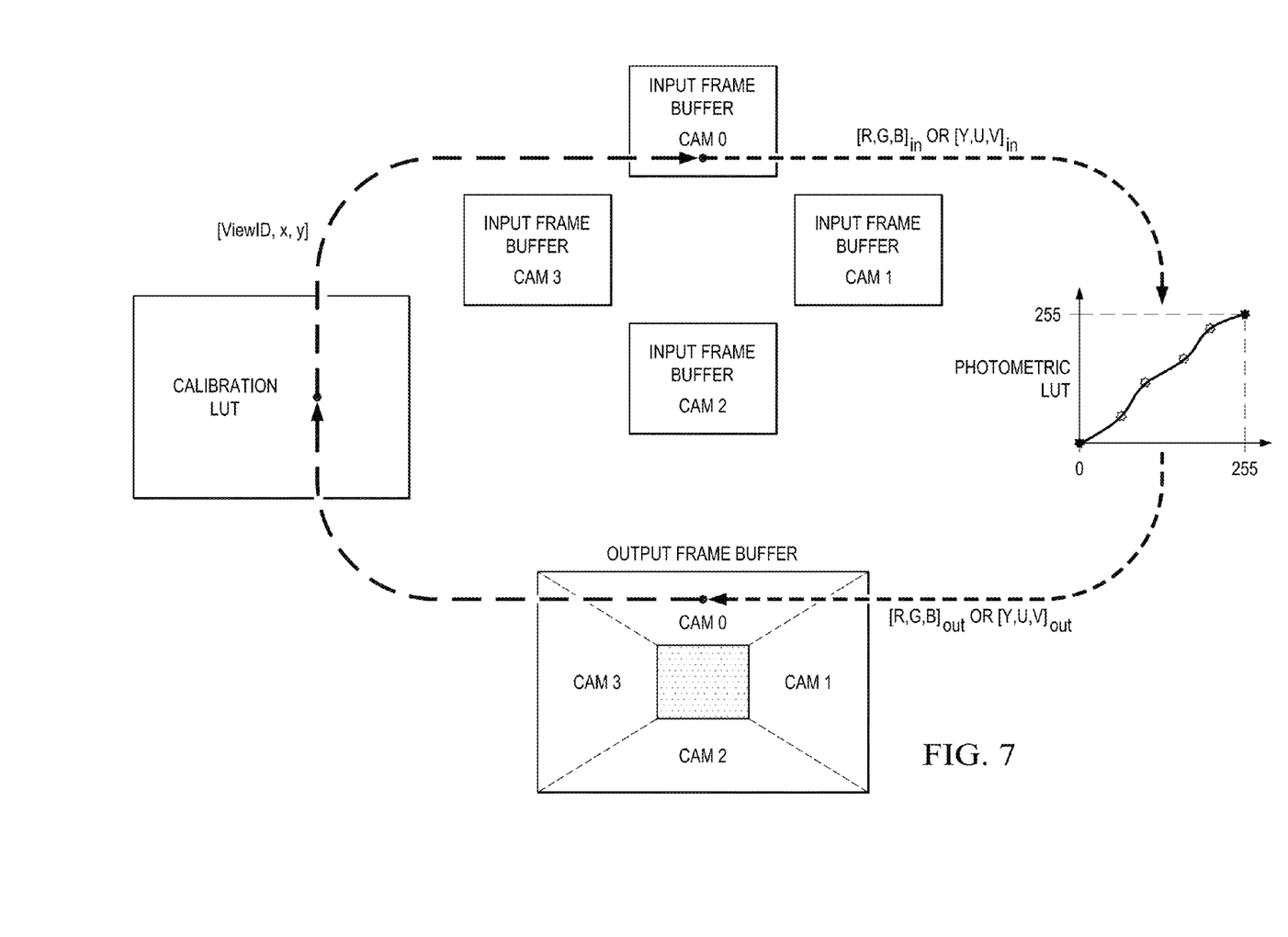
FIG. 7 is an embodiment of a synthesis using the basic stitching method.

FIG. 7 is an embodiment of a tone mapping curves and photometric alignment correction. FIG. 7 illustrates an embodiment of a stitching method. The geometric LUT stores a valid location for each output pixel location with a corresponding pixel location in one of the input images. The decision boundary, which chooses between input images in the overlap region, is usually fixed. Then the photometric LUT specifies how to map the input pixel value to an output pixel value so that the brightness and color of adjacent camera images are matched at the overlapping region.

For RGB input images, the same geometric LUT is usually used for each of the three color channels and pixels are fetched from input images based on geometric LUT. For YUV data, there may be separate LUTs for the Y-plane and the UV-plane, since the UV-plane is typically lower resolution when compared to Y-plane. The LUT for the UV-plane is generated by down-sampling the location indices of the Y-plane accordingly.

For stitching with blending, the geometric LUT corresponding pixel stores location from both images in the overlapping regions. A separate blending LUT specifies weights for each pair of pixels in the two input images. Blending helps in eliminating the visible seams in adjacent camera transitions.

Figure 8:
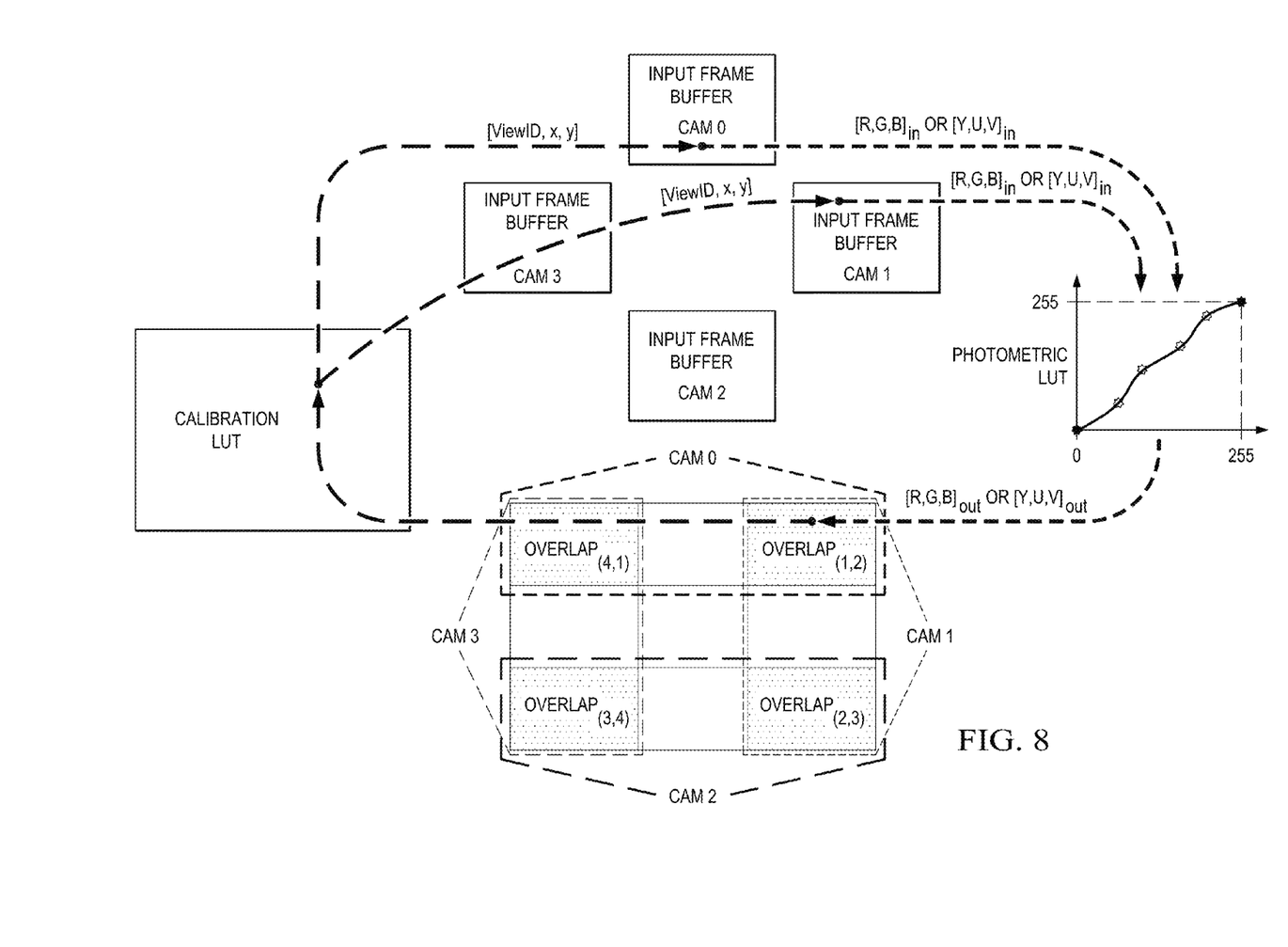
FIG. 8 is an embodiment of a synthesis using the blending method for invisible seam between adjacent cameras.

FIG. 8 illustrates the stitching with blending. The geometric LUT stores different information for non-overlapped and overlapped regions. For each pixel in the non-overlap regions, geometric LUT stores the coordinates of a corresponding pixel location in one of the input images and the view ID of that input image. For each pixel in overlapped regions, the geometric LUT stores the coordinates of two input pixel locations in two of the input images and the view IDs of those input images. In the overlapping regions, we blend the pixels from two images using a linear combination of weights. The weights for each pixel are pre-stored in another LUT which we refer to as the blending LUT. The photometric LUT is used to correct the value of each input pixel, before we blend them for output image.

Figure 9:
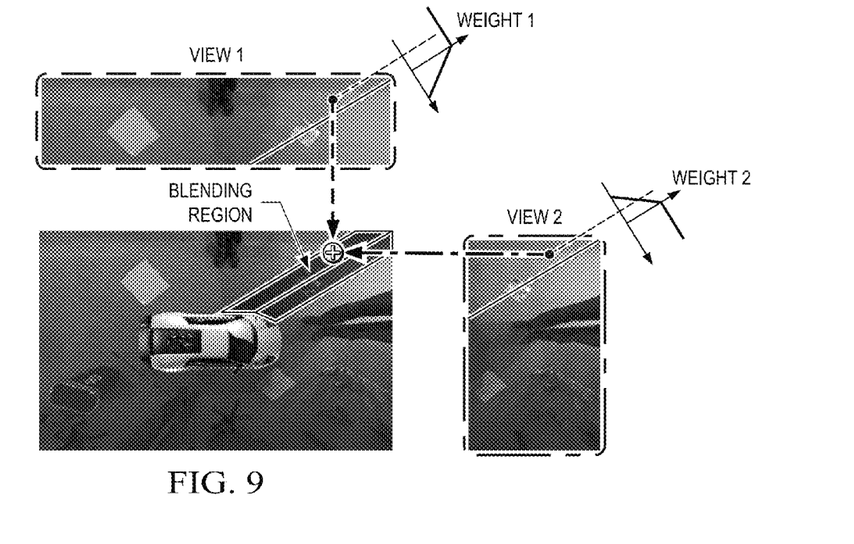
FIG. 9 is an embodiment illustrating blending.

FIG. 9 shows an illustration of the blending for the overlapping regions. It also shows the linear profile of the blending weight. The weight associated with the secondary view decreases as we move away from the decision/overlapping boundary.

Similar to the simple stitching regions, the blending regions have different LUTs for the Y- and UV-planes. But with RGB input images, the same geometric LUT is used for each of the three color channels. FIG. 9 shows an example of synthesis with blending.

Statistics required by photometric function are block average of the input frames in the overlapping regions for each color channel (R,G,B channels for RGB image and Y,U,V channels for YUV frames). Ideally, the statistics should be collected by the photometric alignment block independent of synthesis function, but that will significantly increase memory bandwidth. To reduce memory bandwidth, we collect these statistics in Synthesis function. The synthesis function is accessing pixels from both corresponding images in order to generate the output view, which enables us to combine the task of statistic collection with output synthesis function.

Figure 10:
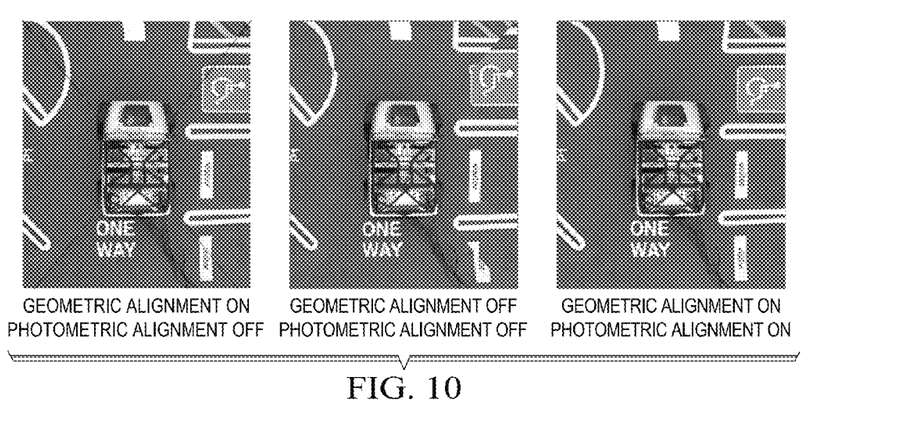
FIG. 10 is an embodiment of a resulting image and/or video from a multi-camera system to produce a seamlessly stitched 360 degree composite view.

FIG. 10 is an embodiment of a resulting image and/or video from a multi-camera system to produce a seamlessly stitched 360 degree composite view. FIG. 10 is an example output from the proposed surround view camera solution. The first image shows the result with geometric alignment ON and photometric alignment OFF, the second image shows the image produced with geometric alignment ON and photometric alignment OFF, and finally, the last image is the output image when both geometric and photometric alignment are ON. The four fisheye input frames are shown in FIG. 2. As shown in the second image of FIG. 10, the composite surround view has inaccurate geometric alignment and no photometric alignment algorithm. Also, there are large geometric errors at view stitching boundaries and large photometric misalignment among, color and brightness, and very noticeable seams. The composite surround view with the proposed geometric alignment algorithm, but with no photometric correction, is shown in the first image of FIG. 10. In this image, the geometric errors are corrected, but photometric errors still exist. The third image is the composite surround view with our geometric and photometric algorithm algorithms. This time, both geometric and photometric misalignments are corrected. Also, a seamlessly stitched 360 degree surround view is achieved.

Even though the presented embodiments show four camera input and output a bird-eye 360 surround view of a vehicle, the proposed solution is designed to extend to any number of cameras. Although our driven use-case is automotive application, it can be adapted easily for other multi-camera applications, such as surveillance cameras, since the underlying fundamental problems remain the same, for example, geometric alignment, photometric alignment, and synthesis.

While the foregoing is directed to embodiments of the present invention, other and further embodiments of the invention may be devised without departing from the basic scope thereof, and the scope thereof is determined by the claims that follow.

What is claimed is:

1. A multi-camera image processing method, comprising:
   performing geometric alignment to produce a geometric output, wherein performing the geometric alignment includes:
      performing perspective correction on each of a plurality of frames;
      performing corner detection in overlapping areas to find regions of interest;
      filtering corner data to locate corners;
      calculating a descriptor for each of the corners;
      matching corners from two cameras using scores;
      finding perspective matrices for each of the frames for minimizing distances between matched features; and
   creating a geometric lookup table that encodes fisheye lens distortion correction and perspective transformation information, the method further comprising:
   performing photometric alignment to produce a photometric output and a blending output;
   using the geometric output and the photometric output for performing a synthesis function for at least one of blending and stitching images obtained from the two cameras; and
   displaying an image obtained from the synthesis function.

2. The multi-camera image processing method of claim 1, wherein the two cameras are two adjacent cameras, and wherein the synthesis function comprises using an alpha blend to blend images from the two adjacent cameras at a seam boundary to eliminate irregularities at the seam boundary caused by image data from the two adjacent cameras.

3. The multi-camera image processing method of claim 1, wherein the geometric function comprises a camera calibration.

4. The multi-camera image processing method of claim 3, wherein the camera calibration is at least one of a dynamic calibration and a one-time calibration.

5. The multi-camera image processing method of claim 1, wherein the input to the synthesis function includes fisheye frames from the two cameras, the geometric output, the photometric output.

6. The multi-camera image processing method of claim 1, wherein the geometric output, the photometric output and blending output are saved in a lookup table in a memory, a geometric lookup table and a photometric lookup table, respectively.

7. The multi-camera image processing method of claim 6, wherein an output of the photometric lookup table has 255 entries for 8-bit data input.

8. The multi-camera image processing method of claim 1, wherein the geometric alignment comprises camera calibration using calibration charts independent of any camera parameters.

9. An image processing system, comprising:
a memory; and
a processor coupled to the memory, the processor configured to:
perform geometric alignment to produce a geometric output;
perform perspective correction on each of a plurality of frames;
perform corner detection in overlapping areas to find regions of interest;
filter corner data to locate corners;
calculate a descriptor for each of the corners;
match the corners from two cameras using scores;
find perspective matrices for each of the frames for minimizing distances between matched features;
create a geometric lookup table that encodes fisheye lens distortion correction and perspective transformation information;
perform photometric alignment to produce a photometric output and blending output;
use the geometric output and the photometric output for performing a synthesis function for at least one of blending and stitching images obtained from the two cameras; and
display an image obtained from the synthesis function.

10. The image processing system of claim 9, wherein the two cameras are two adjacent cameras, and wherein the synthesis function comprises using an alpha blend to blend images from the two adjacent cameras at a seam boundary to eliminate irregularities at the seam boundary caused by image data from the two adjacent cameras.

11. The image processing system of claim 9, wherein the geometric function comprises a camera calibration.

12. The image processing system of claim 11, wherein the camera calibration is at least one of a dynamic calibration and a one-time calibration.

13. The image processing system of claim 9, wherein the input to the synthesis function includes fisheye frames from the multi-cameras, the geometric output, the photometric output.

14. The image processing system of claim 9, wherein the geometric output, the photometric output and blending output are saved in a lookup table in the memory, a geometric lookup table and a photometric lookup table, respectively.

15. The image processing system of claim, wherein an output of the photometric lookup table has 255 entries for 8-bit data input.

16. The image processing system of claim 9, wherein the geometric alignment comprises camera calibration using calibration charts independent of any camera parameters.

* * * * *